United States Patent [19]

Massey

[11] Patent Number: 4,558,174
[45] Date of Patent: Dec. 10, 1985

[54] CABLE CLOSURE

[75] Inventor: John R. Massey, Lawrenceville, Ga.

[73] Assignee: AT&T Bell Laboratories, Murray Hill, N.J.

[21] Appl. No.: 597,679

[22] Filed: Apr. 6, 1984

[51] Int. Cl.[4] .......................................... H02G 15/113
[52] U.S. Cl. ........................................ 174/92; 174/78; 174/93; 292/247; 292/DIG. 49
[58] Field of Search ...................... 174/21 R, 22 R, 92, 174/93, 77 R; 292/247, 256.69, DIG. 49

[56] References Cited

U.S. PATENT DOCUMENTS

| | | | |
|---|---|---|---|
| Re. 28,468 | 7/1975 | Baumgartner et al. | 174/88 R |
| 830,182 | 9/1906 | Skov | 292/247 |
| 3,337,681 | 8/1967 | Smith | 174/92 |
| 3,545,773 | 12/1970 | Smith | 174/92 X |
| 3,636,241 | 1/1972 | Baumgartner | 174/92 |
| 3,692,926 | 9/1972 | Smith | 174/92 |
| 3,701,835 | 10/1972 | Eisele et al. | 174/92 |
| 3,796,823 | 3/1974 | Wright et al. | 174/92 |
| 3,798,349 | 3/1974 | Thompson et al. | 174/92 |
| 3,836,694 | 9/1974 | Kapell | 174/92 X |
| 3,875,325 | 4/1975 | Anderson et al. | 174/92 |
| 3,935,373 | 1/1976 | Smith et al. | 174/77 R |
| 4,181,814 | 1/1980 | Smith | 174/92 |
| 4,262,167 | 4/1981 | Bossard et al. | 174/77 R X |
| 4,295,005 | 10/1981 | Daugherty et al. | 174/92 X |
| 4,341,922 | 7/1982 | Bossard et al. | 174/92 |
| 4,350,842 | 9/1982 | Nolf | 174/92 |
| 4,358,634 | 11/1982 | Dienes | 174/92 X |
| 4,361,721 | 11/1982 | Massey | 174/92 |
| 4,362,352 | 12/1982 | Hawkins et al. | 174/94 R |
| 4,376,231 | 3/1983 | Sabia et al. | 174/92 |

FOREIGN PATENT DOCUMENTS

236792  7/1925  United Kingdom ............... 292/247

Primary Examiner—A. T. Grimley
Assistant Examiner—Morris H. Nimmo
Attorney, Agent, or Firm—E. W. Somers

[57] ABSTRACT

A closure (20) for a cable splice includes two mating covers (23, 24) and two end plate assemblies (30—30). Longitudinally extending joints between the covers are filled with sealing gaskets (141—141). Also a peripheral channel (45) in each end plate is filled with a circumferential gasket (147). The covers are assembled together to enclose the end plate assemblies with the gaskets in the joints therebetween. Then, the covers are moved toward each other and secured together by moving a continuous wire latch support frame (121) which is disposed on each side of the closure and which has a plurality of latching fingers (126—126) mounted pivotally therealong to cause each latching finger to snap past a center bistable position into locking engagement with an aligned seat along the closure. As the covers become secured together, the longitudinal and circumferential gaskets are caused to seal their associated joints. Also, at each confluence of the covers and each end plate assembly, the longitudinal gaskets which span across weakened longitudinally extending portions of the circumferential gaskets become disposed in compliant engagement therewith to form seals. The wire latch support frame is sufficiently resilient to cause the forces which are applied to be adequate under a wide range of temperature conditions to maintain effective seals.

14 Claims, 19 Drawing Figures

Fig_3

Fig_4

Fig_18

Fig_8

Fig_10

Fig_12

Fig_19

CABLE CLOSURE

TECHNICAL FIELD

This invention relates to a cable closure. More particularly, it relates to a closure which encloses a cable splice, for example, and which prevents the ingress of moisture and the egress of pressurized gas before and after reentry.

BACKGROUND OF THE INVENTION

Where two ends of a cable such as a telecommunications cable are spliced together, the splice area is ordinarily housed within a protective cover known as a closure. Common to substantially all closures is the requirement that they restrict moisture ingress. The integrity of seals which are used to restrict moisture ingress is important especially because of transmission parameters which are readily effected by changes in the moisture content within the cable. Also, common to most closures is the provision of some degree of cable strain relief to prevent splice separation.

Such closures often have included cylindrical covers with one or more longitudinal joints and end plates that surround incoming and outgoing cables and that form seals with the covers. An example of a prior art closure is shown in U.S. Pat. No. 3,636,241 which issued on Jan. 18, 1972 in the names of R. G. Baumgartner et al. Closures which are effective in providing protection for the splice connections are available in the marketplace, but their assembly is relatively time consuming, often requiring specialized tools and equipment which in a limited space such as an underground tunnel are difficult to handle and operate.

To prevent the ingress of moisture some systems employ dry air, nitrogen or a similar chemically inert gas in the cables and closures. In this type of closure, the gas is pressurized to create a flow from enclosed equipment through any openings and prevent the ingress of moisture. In such a system, it is advantageous to minimize the amount of gas leakage to reduce the consumption of gas needed to maintain adequate pressure throughout the system. Accordingly, closures and associated equipment should be sealed adequately to prevent a reduction in pressure and the loss of gas. At the same time it is necessary to provide a system which is easily assembled in the field and in which the probability of installer error is relatively low.

Heretofore a number of closure designs which can provide effective sealing have been available. One major problem with earlier designs has been the need for close tolerances and interference fits. Mechanisms requiring close tolerances and interference fits often are easily damaged in the field where assembly is performed, are expensive to manufacture, and also may require close attention to assembly. These considerations add significantly to both the initial cost of the closure and to the cost of its assembly in the field.

In a closure shown in U.S. Pat. No. 4,181,814, a gasket extends along the longitudinal split in hinged covers. Integral with the gasket at each end thereof is a transverse portion which is wrapped about the periphery of an end plate to form a seal between the end plate and enclosing cover portions. The longitudinal gasket is tapered as are channer members in which it is received to permit a wedge-shaped retainer to compress the gasket and provide a seal.

Despite their design, such closures may still admit moisture where they are improperly assembled. To overcome an inability to assemble simply and seal reliably such closures, reliance often has been placed on the extensive use of a mastic sealing material. However, the extensive use of mastic material often requires substantial installer preparation.

In the recent past, closures have been filled to provide moisture protection or sealed in ways other than with pressurized gas. One known closure utilizes a rigid outer cover, but is filled with a viscous waterproofing material. Another commonly used closure includes a heat shrinkable sleeve. In addition to requiring special heating tools, there is a potential for deterioration of the integrity of the sleeve material due to overheating.

Not infrequently, due to line failure or routine maintenance, one or more cables must be joined or ones of the conductors are rejoined to others. Thus the reentry of and the effective resealing of the closure becomes necessary. Accordingly, the reentry of the closure and its resealing should be made as easy as possible. Obviously, the reentry of closures that are filled with a waterproofing material or that rely on the extensive use of a mastic material becomes a time-consuming task for a craftsperson. For access to the splice area, the filling or mastic sealing material must be removed, creating problems in removal, temporary storage or disposal.

There is still a need for a closure which facilitates reentry and subsequent reassembly. Such a closure is desirable where known future changes will be required in splice connections or where strong possibilities of such changes exist. Seemingly, the prior art does not include a relatively inexpensive, reliable closure which is easy to install to cover splices of pressurized communications cables, for example, and which allows simple reentry to the splice and subsequent reassembly.

SUMMARY OF THE INVENTION

The foregoing problems have been solved by a closure of this invention. The closure which is adapted to have at least one cable extending thereinto includes first and second aligned end plates being spaced apart with at least one end plate having an opening therein to allow the at least one cable to extend therethrough. First and second covers which are assembled together to enclose peripheries of the end plates and the at least one cable that extends through at least one end plate include adjacent longitudinal edge portions having facing grooves. A circumferential resilient gasket having longitudinally extending weakened portions is disposed about the periphery of each end plate between the end plate and the covers. Longitudinal resilient gaskets which are disposed within the facing grooves at each joint between the covers span across adjacent weakened portions of the circumferential gaskets at the joints between the covers and the end plates. Each longitudinal gasket is in compliant engagement with the weakened portions of the circumferential gasket and with walls which form the grooves at each confluence between the covers and an end plate. The closure also includes securing means for applying forces to the covers to hold the covers secured together. The forces are sufficient to cause the circumferential and longitudinal gaskets to provide seals between the covers and between the covers and the end plates and to be maintained sealed in compliant engagement with each other at the confluence of the covers and each end plate.

In a preferred embodiment, the closure includes a first cover portion and a second cover portion which are adapted to be assembled together to form two longitudinally extending joints. A reuseable gasket is disposed in facing grooves in each of the longitudinally extending joints, the gasket being made of a resilient material. The closure also includes first and second end plates which are disposed at opposite ends of the cover portions with the first and second cover portions enclosing the peripheries of the end plates. A reuseable resilient gasket is disposed about the circumference of each said end plate in the joint formed between the end plate and the cover portions which enclose the peripheries of the end plates. Each circumferential gasket is formed with a plurality of longitudinally extending fins which define grooves therebetween. The gasket about each end plate is adjacent to the longitudinally extending gasket at each confluence of a longitudinally extending joint and the periphery of the end plate. Facilities are provided for applying forces to the cover portions to move the cover portions toward each other and to secure them together. The forces are sufficient to compress the longitudinally extending gaskets to provide longitudinally extending seals. Also, these forces are sufficient cause at least a portion of each longitudinally extending gasket at each confluence of the cover portions and an end plate to protrude slightly into sealing engagement with the finned portions of the circumferential gasket and to cause adjacent portions to be displaced into sealing engagement with portions of walls which form the grooves in which the gasket is disposed. Because the circumferential gasket is finned, the forces which must be applied to the cover portions to obtain the sealed engagement of the gaskets may be applied manually.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
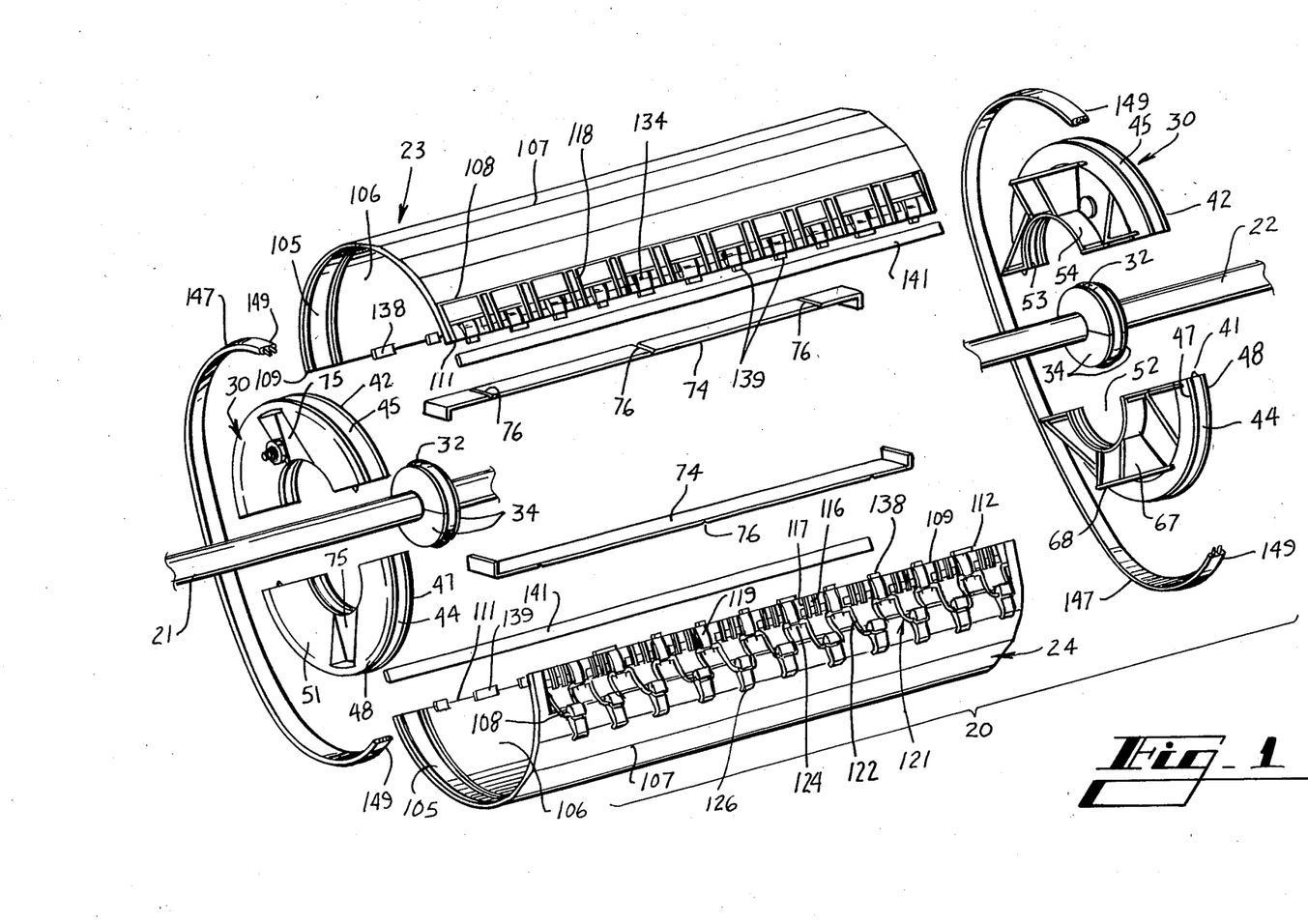
FIG. 1 is an exploded overall perspective view of a closure of this invention.

Referring now to FIG. 1, there is shown a closure which is designated generally by the numeral 20. The closure 20 is used to enclose a portion of a cable to which are spliced conductors or a splice of two cables 21 and 22 in order to prevent the ingress of moisture which could affect adversely the transmission characteristics of the cable. The closure 20 is such that it provides a seal about the cable or cables which extend thereinto and seals between components thereof which are assembled. Further, the closure 20 is such that it is reenterable and that its component portions are capable of being reassembled easily with the seals being reuseable.

Figure 2:
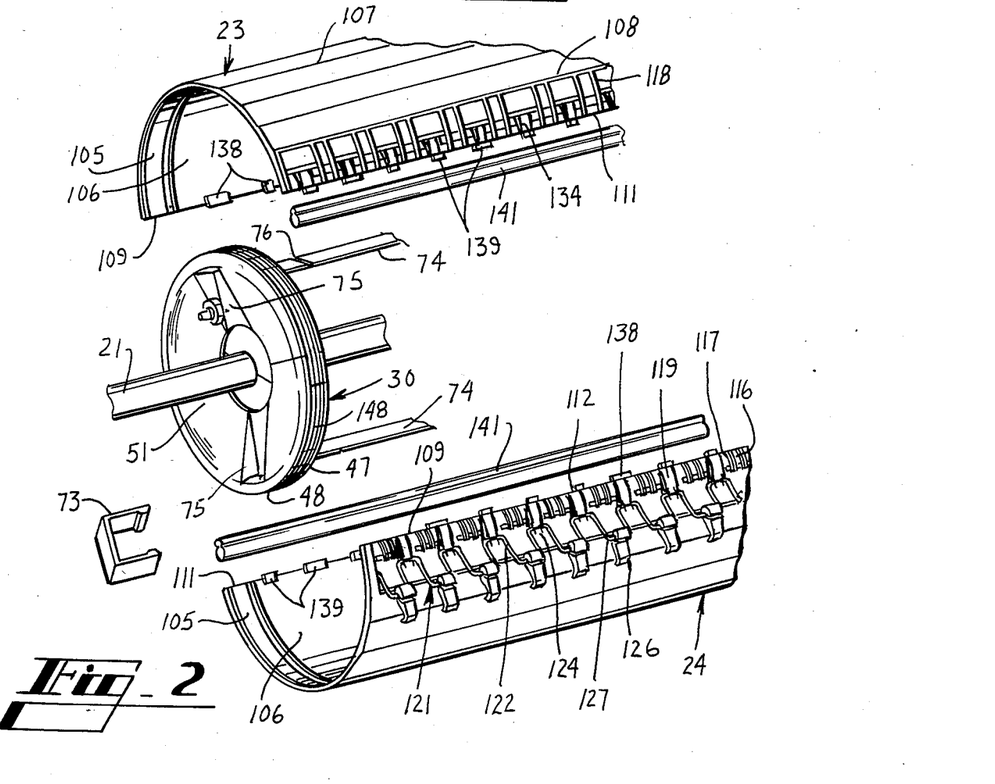
FIG. 2 is an exploded perspective view of a portion of the closure of this invention including two covers and one end plate assembly with a cable extending into the closure.

The closure 20 includes a pair of covers which are referred to as first and second covers and which are designated generally by the numerals 23 and 24 (see also FIG. 2). Each of the covers 23 and 24 has a generally semicircular cross section and a generally uniform thickness. The covers 23 and 24 are adapted to be assembled together with end plate assemblies 30—30 through which the cables extend to form a generally cylindrical closure. The covers are made of a glass-mat reinforced polypropylene plastic material and the end plate assemblies are made of a glass-filled polypropylene plastic material.

The preferred embodiment will be described in terms of a closure 20 into which two cables extend for splicing. One of the cables 21 extends into the closure through one of the end plate assemblies 30—30 and the other cable 22 through the other end plate assembly. In the field, a craftsperson assembles an end plate assembly 30 to one of the cables to be spliced and another end plate assembly to the other cable. After the splice between the cables 21 and 22 has been made, the craftsperson assembles the covers 23 and 24 about the end plate assemblies 30—30.

Prior to assembling an end plate assembly 30 to a cable, the cable must be prepared. A sealing tape 32 is wrapped in a plurality of convolutions about the cable between two retaining washers 34—34 which are adapted to be received in an opening formed through the end plate assembly 30. In a preferred embodiment, the sealing tape is one designated B-sealing tape which is made of a material comprising carbon black, polybutene and butyl rubber and which is manufactured by RuVan, Inc, for example.

The end plate assemblies 30—30 are shown in FIGS. 1-4. Each end plate assembly 30 is comprised of two substantially identical portions 42 and 44. Each of the portions 42 and 44 includes diametrically opposed troughs 43—43 in a surface 46 (see FIG. 4) along which the portions are mated. The portions 42 and 44 each have a tapered lug 41 extending from one side of the surface 46 and a depression in an opposite side to assist in mating the portions. Also, each portion 42 or 44 includes a circumferential channel 45 which includes spaced flanges 47 and 48 and which communicates with the troughs 43—43. The troughs 43—43 are designed to receive a sealing member 49 (see FIG. 3) which prior to assembly of the portions 42 and 44 has a generally circular cross-section and which is made, for example, of the same material as the tape 32.

The flange 48 is formed integrally with a wall 51 which converges inwardly (see FIG. 1) toward the interior of the closure. See co-pending, commonly assigned application Ser. No. 597,688 filed on even date herewith in the name of A. H. Williamson, Jr. More particularly, the wall 51 provided by the assembled portions 42 and 44 forms a truncated cone.

Figure 4:
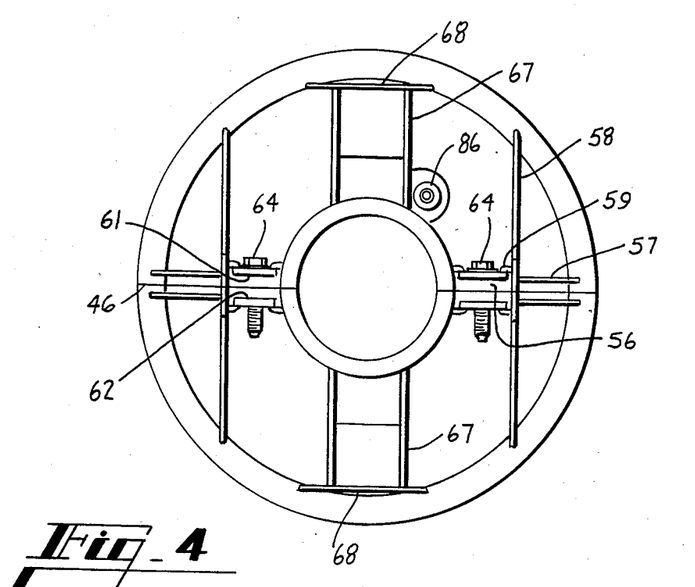
FIG. 4 is an elevational view of an assembled end plate assembly as taken from inside the closure.

As can be seen in FIGS. 1-2, the wall 51 formed by the end plate portions 42 and 44 terminates adjacent to a circular cable engagement portion 52 (see FIG. 1) in the form of a-hub. The hub 52 is comprised of two semicircular hub portions 54—54 each being formed with one of the portions 42 and 44 and each being provided with a groove 53. As can be seen in FIGS. 2 and 4, the hub 52 is disposed within the closure 20 and is offset from the flanges 47 and 48 in a direction along a longitudinal axis of the closure. Further, the groove 53 which communicates with the troughs 43—43, is formed to have a triangularly shaped cross-section. The taped portion of the cable and the retaining washers are received between opposite walls of the groove 53. The triangular shape of the bed of the grooves enhances the seal between the taped portion of the cable and the hub 52.

The inwardly converging shape of the wall 51 of the end plate assembly permits internally disposed fasteners to be aligned with the hub 52 and hence with the sealing tape. Balanced forces are thereby applied by fasteners which are disposed within the closure. Also, this configuration allows the wall 51 to be made with a substantially uniform thickness which is preferable from an injection molding standpoint, and causes the end plates to be able to withstand better the pressure inside the closure.

Further, adjacent to each of diametrically opposed ends of the hub 52 is formed a shelf 56 (see FIG. 3) supported by stiffeners 57—57 and 58—58. A guideway is formed by portions 59—59 which overhang and secure metallic bearing plates 61 and 62. When the end plate sections 42 and 44 are assembled together, holes in the plates 61 and 62 become aligned with each other and with holes through the shelves 56—56. Fasteners 64—64 (see FIG. 4) are inserted through clearance holes in the plates 61—61, through the aligned holes in the shelves and threaded ones in the plates 62—62 and turned into engagement with the bearing plates to secure together the portions 42 and 44.

Extending radially from the center of each of the cable engagement hub portions 54—54 is an alignment bar nest 66. It includes spaced ribs 67—67 which support a platform 68 having an aperture 69 therein. Between the platform 68 and the flange 47 of each portion 42 and 44 is formed a slot 71. The slot 71 is designed to receive a downturned end 72 of an alignment bar 74 which extends from one end plate assembly to the other.

As can be seen in FIG. 1, the alignment bar 74 has notches 76—76 spaced therealong. The end notches act as a gauge so that the craftsperson knows the length of jacket to be removed from the cable. Also, it serves to locate the outer one of the sealing washers 34—34. A center notch is used to locate the splice between the cables 21 and 22.

Also, as can be seen in FIGS. 1 and 2, aligned with each slot 71 is a well 75 formed in the exterior of the end plate. This causes a portion of the flange to be exposed and allows a U-shaped clip 73 (see FIG. 2) to be moved over the flange and the covers 23 and 24 to hold the covers in engagement with the end assemblies 30—30 preparatory to the securing of the covers.

The closure 20 also includes provisions for gripping the jacket of each cable which extends through an end plate assembly to provide strain relief therefor. Each end plate assembly 30 includes a pair of V-shaped jawtooth clamps 77—77 (see again FIG. 3). Each jaw tooth clamp 77 includes flanges 78—78. One end of each clamp is formed with teeth 79—79 which become embedded in the cable jacket when the clamps are mounted on the end plate assembly. The toothed end of each clamp also is formed with a slot 81 which is adapted to have a hose clamp 82 passed therethrough.

Figure 3:
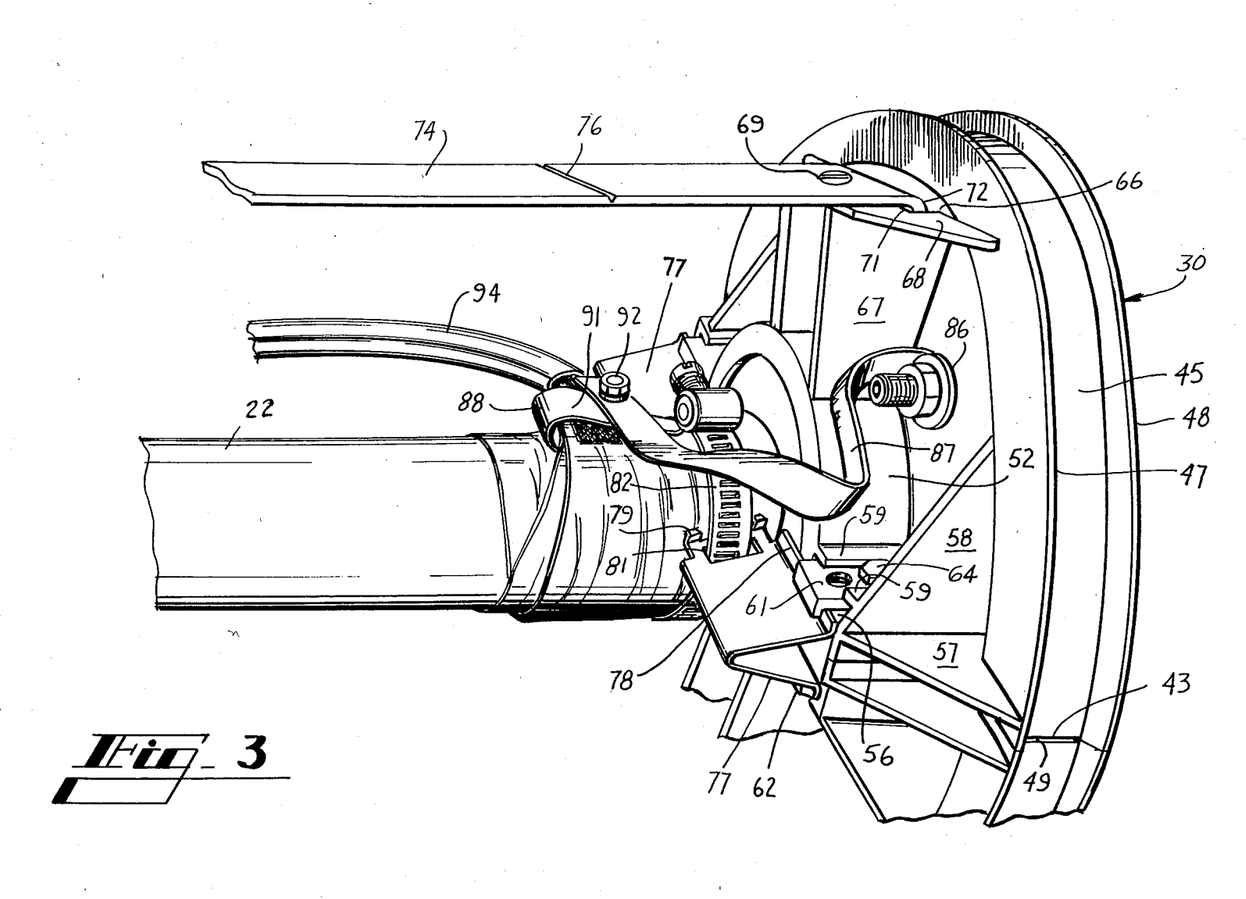
FIG. 3 is a detailed view of a portion of an end plate assembly which shows cable securing facilities and the junction between a longitudinally extending tie bar and the end plate assembly.

Initially, a craftsperson positions two portions 42 and 44 about the cable 21 with sealing members 49—49 in the troughs 43—43. The fasteners 64—64 are turned to fasten together the end plate portions 42 and 44 of each end plate assembly 30 and to reconfigure the sealing material so it fills substantially the troughs 43—43 and provides air-tight seals. As can be seen in FIG. 3, each clamp 77 is mounted on aligned shelves 56—56 with the flanges 78—78 being received under the overhanging portions 59—59 of the bearing plates. The clamps 77—77 are moved slidably along the shelves until the teeth 79—79 become embedded in the cable jacket. A hose clamp 82 is passed through the slots 81—81 of the clamps of each end plate assembly about the cable extending therethrough and tightened. The end 72 of an alignment bar is inserted into one of the slots 71—71 of the just-assembled end plate assembly 30 and the other end used to gauge the location of the other end plate assembly.

Each end plate assembly 30 also may be provided with a grounding and valve adapter 86 (see FIG. 3) which provides access to the interior of the closure 20 for introducing pressurized gas. Further, as can be seen in FIG. 3, a grounding strap 87 is used to provide a connection between the adapter 86 and provisions in the closure 20 for carrying electrical continuity across the splice. This is accomplished by providing a bond clamp 88 such as that shown in U.S. Pat. No. Re. 28,468 issued July 8, 1975 in the names of R. G. Baumgartner and H. J. Graff. A portion of the bond clamp 88 is positioned in engagement with a metallic shield of the cable and another portion 91 is clamped to the outer jacket through a threaded stud 92. A braided conductor 94 is attached to the threaded studs to opposite ends of the closure to carry electrical continuity from one cable to the other.

As can be seen in FIGS. 1 and 2, each cover 23 and 24 includes a channel 105 formed about an inner surface 106 thereof at each of its ends. When the covers 23 and 24 are assembled together, the semi-circular channels at each end form a circular channel which is adapted to receive an end plate assembly 30 of the closure.

Each cover 23 and 24 is such that its outer surface is formed by a plurality of relatively short segments. As a result, the outer surface of each cover exhibits a plurality of parallel lines 107—107. Further, each cover includes a rib 108 which extends longitudinally along the cover a relatively short distance from each of its longitudinal edges 109 and 111. Portions of the covers along the longitudinal edges 109 and 111 are formed to include longitudinally extending grooves 112 and 113, respectively (see FIG. 5). An outer wall 114 which defines the groove 112 extends past an inner wall 115.

Figure 5:
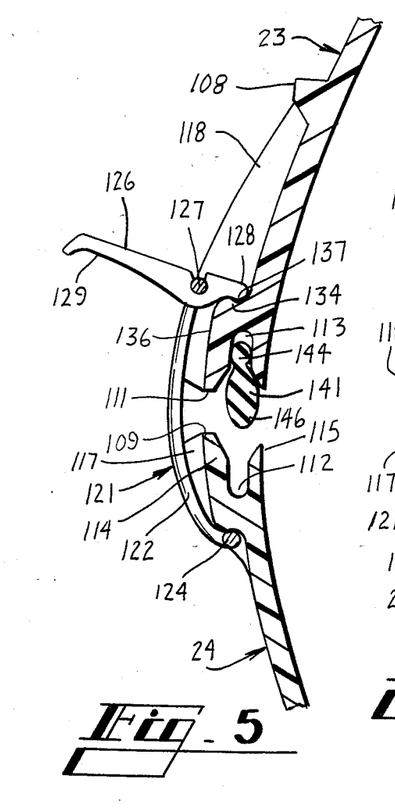
FIG. 5 is a detail view of a joint formed between the two covers and of a latching arrangement for securing the covers about the end plate assemblies.

The closure 20 includes facilities for securing together the covers 23 and 24 (see FIGS. 1, 2 and 5). Each cover 23 and 24 includes a plurality of separators 116—116 along the one edge 109 and a plurality of separators 118—118 along the other edge 111. Each of the separators 116—116 includes a pair of spaced ears 117—117 which project outwardly from the cover. Between the separators 116—116 is formed a seat 119. The separators 116—116 and the seats 119—119 are adapted to receive a continuous self-adjusting wire latch support frame 121 which includes a plurality of U-shaped portions 122—122 and which is made of a corrosion-resistant material. Further, as can be seen in FIG. 5, the U-shaped portions 122—122 of the wire latch support frame 121 are shaped arcuately.

One resilient latch support frame 121 is attached to the one longitudinal edge portion 109 of each cover 23 and 24. Each of a plurality of spaced colinear portions 124—124 of the wire latch support frame are snap-locked to associated ones of the seats 119—119. The snap-locking is accomplished so that the entire wire latch frame is capable of being moved pivotally.

The wire latch support frame 121 also is provided with a plurality of latching fingers 126—126. Each latching finger is mounted pivotally about a fulcrum which comprises one of a plurality of spaced colinear wire portions 127—127 which are parallel to the wire portions 124—124. The fingers are made of a plastic material such as polypropylene. As can be seen best in FIG. 5, each latching finger 126 includes one end portion 128 and another longer, end portion 129. The end portion 128 cooperates with portions of the mating cover whereas the end portion 129 is used by a craftsperson as a lever to turn pivotally the latching finger 126 and to seat the end portion 128.

Viewing now FIGS. 1-2, it can be seen that the other longitudinal edge portion 111 of each cover 23 and 24 is formed to include the plurality of pairs of separators 118—118. Each of the separators 118—118, unlike a separator 116, extends to the adjacent rib 108. The longitudinal edge portion 111 also includes a plurality of seats 134—134 which alternate with the pairs of separators. The seats 134—134 are such that one portion 136 (set FIG. 5) of each is substantially tangential to the joint formed between the two covers when they are assembled. Another portion 137 of each seat 134 angles inwardly generally toward a longitudinal centerline of the closure 20.

When the covers are assembled together, the separators 116—116 and seats 119—119 along the longitudinal edge portion 109 of each cover become disposed adjacent to the arrangement of separators and seats along the adjacent longitudinal edge portion 111 of the other cover. Then the latching fingers 126—126 are turned to move the covers toward each other and to secure them together. As the lever portion 129 of each latching finger 126 is turned, it passes through a center position (see FIG. 6) in which its fulcrum 127 is aligned with the portion 137 of the seat 134 into which it will be secured and the portion 124 that is snap-locked to the other cover. In this position, it applies maximum compressive force to the longitudinal joints between the cover 23 and 24. However, in that position, the latching finger 126 is in an unstable or bistable condition and could move in either rotary direction. If it moved outwardly, then it would become loose and would not secure together the covers 23 and 24. Therefore, to secure the covers 23 and 24, the end 129 of the latching finger 126 must be moved toward the closure to engage a cover and firmly seat each end 128 in engagement with the associated seat 134 (see FIG. 7). This arrangement is referred to as an overcenter latching arrangement.

The covers 23 and 24 also include provisions for locating the covers longitudinally with respect to each other (see FIGS. 1 and 2). The longitudinal edge portions 109 and 111 of each cover include a plurality of depending teeth 138 and 139, respectively, with the teeth 139 being offset longitudinally from the teeth 138. When the two covers are brought together, the teeth 138 of the cover 23 become interdigitated with the teeth 139 of the cover 24. Also, the teeeth 138 of the cover 24 become interdigitated with the teeth 139 of the cover section 23. These teeth assist in the longitudinal and transverse orientation of the covers 23 and 24 during assembly.

Figure 8:
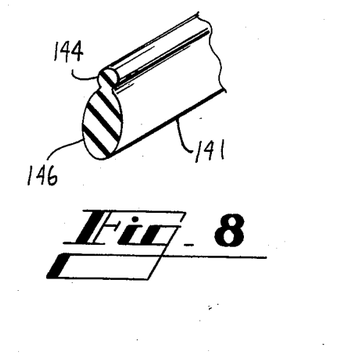
FIG. 8 is a perspective view of a portion of a longitudinal gasket which is used to provide a seal between the two covers.
Figure 9:
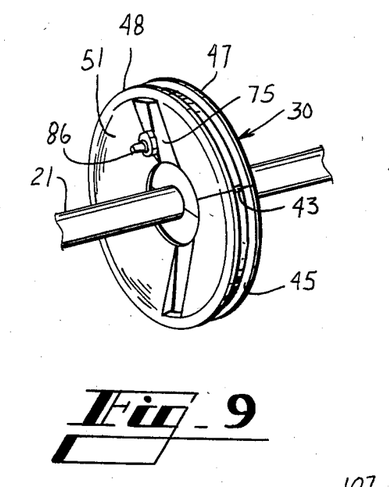
FIG. 9 is a perspective view of an end plate assembly of the closure of FIG. 1 after it has been assembled about a cable.

The end plate assemblies are assembled about the cables 21 and 22 (see FIG. 9) with sealing member 49—49 which comprise part of an overall sealing system in the troughs 43—43. Afterwards, the covers are assembled over the end plate assemblies 30—30. Prior to the assembly of the covers 23 and 24 to each other and to the end plate assemblies 30—30, remaining elements of the sealing system (see FIGS. 1-2) are introduced into the closure. The sealing system includes a pair of longitudinally extending gaskets 141—141 which are made of a resilient material such as silicone rubber, for example. Each of the gaskets 141—141, which are depicted in FIG. 8, includes a head portion 144 and a body portion 146. The gaskets 141—141 are positioned in the longitudinally extending grooves of the one of the covers 23 or 24.

Figure 10:
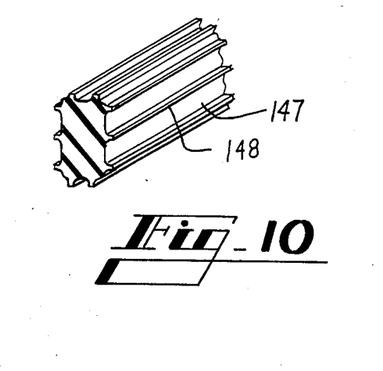
FIG. 10 is a perspective view of a portion of a circumferential gasket which is used to provide a seal between an end plate assembly and the covers.
Figure 11:
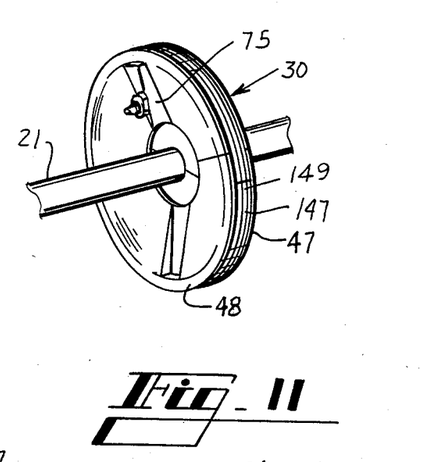
FIG. 11 is a view of the end plate assembly of FIG. 9 after the gasket of FIG. 10 has been placed circumferentially thereabout.
Figure 12:
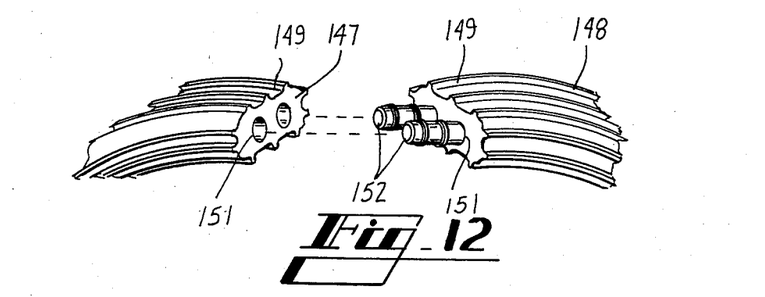
FIG. 12 is a detail view of a joint between end portions of the gasket which is placed circumferentially about an end plate assembly.

Then each of a pair of circumferential gaskets 147—147 (see FIG. 10) having longitudinally extending weakened portions in the form of ribs 148—148 is positioned in one of the channels 45—45 of each end plate assembly 30 (see FIG. 11). The gaskets 147—147 also are made of a resilient material such as silicone rubber, for example. Ends 149—149 of the each circumferential gasket 148 are connected together. This is accomplished by forming each circumferential gasket with a pair of longitudinally extending passageways 151—151 (see FIG. 12). At the junction of the ends of the gasket 147, pins 152—152 are positioned in the passageways 151—151 such that they extend from one end. The other end 149 is brought into juxtaposition with the one end and the extending pins 152—152 caused to be positioned in the passageways 151—151 of the other end. A room temperature vulcanizeable (RTV) material is applied over the joint. It should be observed that the joint between the ends 149—149 of the circumferential gasket is offset from that between the end plate portions 42 and 44.

In a next step of assembly, the cover 24 is positioned to enclose portions of the peripheries of the end plate assemblies 30—30. Prior to the assembly of the top cover 23 to the bottom cover 24, the craftsperson applies room temperature vulcanizeable material to each longitudinal gasket 141 adjacent to its intersection with each circumferential gasket 147. This helps to insure that an air tight seal will be formed at the so-called triple point, that is, at each confluence of the covers 23 and 24 and an end plate assembly 30.

The material which is used to supplement the seal at the triple point and about the juncture of the ends 149—149 of each circumferential gasket 147 must meet certain requirements. It must of course have a sealing capability. Also, it must have lubricating qualities and it must not create a corrosive environment within the closure. A suitable sealing material is a B-sealant silicone material which cures on exposure to the atmosphere and which is manufactured by the Devcon Company of Danvers, Massachusetts, and by Dow Corning Corporation of Midland, Michigan.

Exposed peripheral portions of the end plate assemblies 30—30 are received in the semi-circular flange channels 105—105 of covers 23 and 24. As will be recalled, the depending tabs spaced along the longitudinal edges 109 and 111 of the covers are of assistance in aligning the covers. Also, the alignments bars 74—74 which have their downturned ends received in the slots of the end plate assemblies assist the craftsperson in aligning the end plate assemblies and in maintaining their position prior to assembly of the cover 23 with the cover 24.

Figure 13:
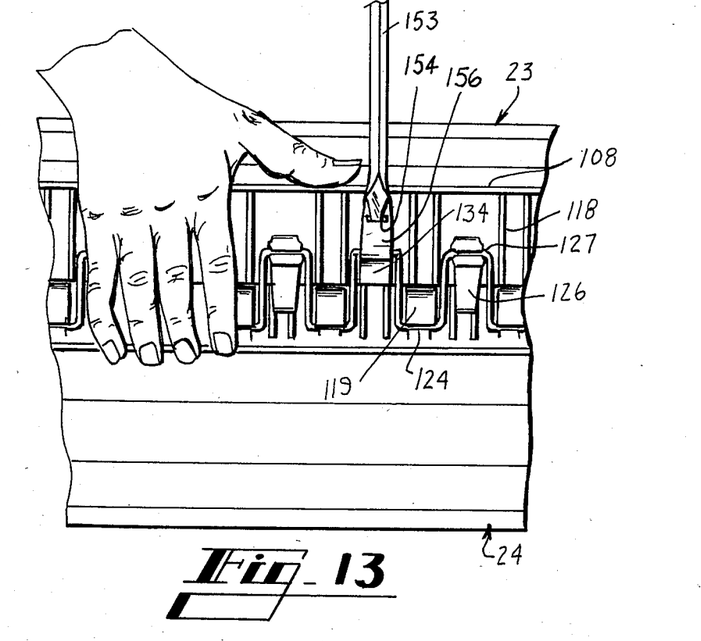
FIGS. 13-14 are a series of views depicting portions of the covers as they are secured together.

Returning now to FIGS. 5-7, there are shown the sequence of views depicting the actuation of the unique latching arrangement of this invention to secure together the covers 23 and 24. The covers 23 and 24 are brought together with the longitudinal edge portion 109 of each becoming disposed adjacent to the other longitudinal edge portion 111 of the other. Then while holding the two covers together manually (see FIG. 13) a craftsperson turns each wire latch support frame 121 to dispose the latching fingers 126—126 adjacent to the longitudinal edge portion 111 of the adjacent cover.

Figure 14:
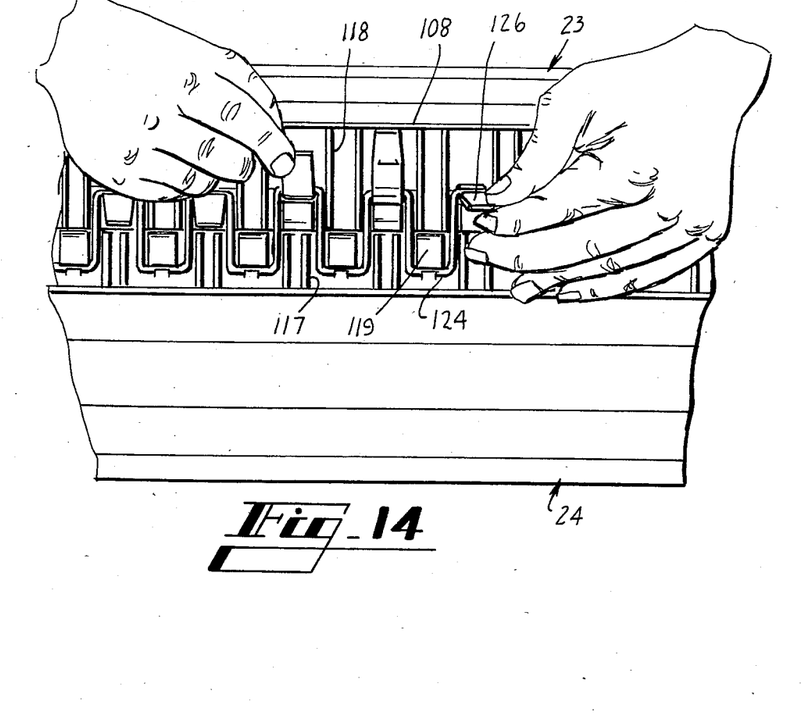
Figure 15:
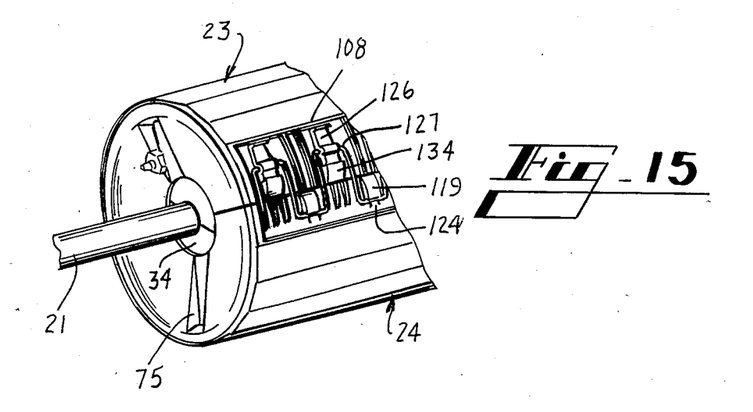
FIG. 15 is a perspective view showing a portion of the closure after the end plate assemblies and covers have been assembled and after the actuation of the latching arrangement.

An end of a tool such as a screwdriver 153 (see FIG. 13) is inserted into a slot 154 in each of several latching fingers 156—156 which are specially formed to include a lengthened leverage span. The fulcrum on the wire support 121 is spaced farther from the one end 128 than in the remaining fingers. This provides greater leverage when bringing the covers together initially. The craftsperson moves the screwdriver toward the cover 23 to cause the special latching finger 156 to apply forces to the one cover to move it into compressing relation with the other cover and to secure that latching finger in a locked position (see FIG. 14). As a result, it becomes much easier to seat each of the other latching fingers 126—126 by hand. Each end 128 of each remaining latching finger 126 is engaged with an associated seat 134 and the lever portion 129 of the finger turned to apply forces to the seat. As the lever portion 129 is turned, it passes through a center position in which its fulcrum 127 is aligned with the portion 137 of the seat 134 into which it will be secured and the seat of the other cover 24. As the lever end 129 of each latching finger 126 passes over the so-called center position, it snap-locks against the cover 23 to secure itself in position. This procedure is repeated for the latching fingers of the cover 23. The covers 23 and 24 become moved toward each other and are secured together (see FIGS. 7 and 15).

The resilient wire support frame 121 is important to the latching mechanism of the closure 20. Because of the resiliency of the support frame 121, the latching fingers 126—126 tend to draw the covers 23 and 24 together as the gaskets contract under cold temperature conditions. For higher temperatures, the gaskets expand and the wire support frame 121 yields to accommodate such expansion. The sealing system of the closure of this invention is effective in a temperature range of from −40° F. to 140° F. at an internal pressure of 10 psi.

Figures 6, 7:
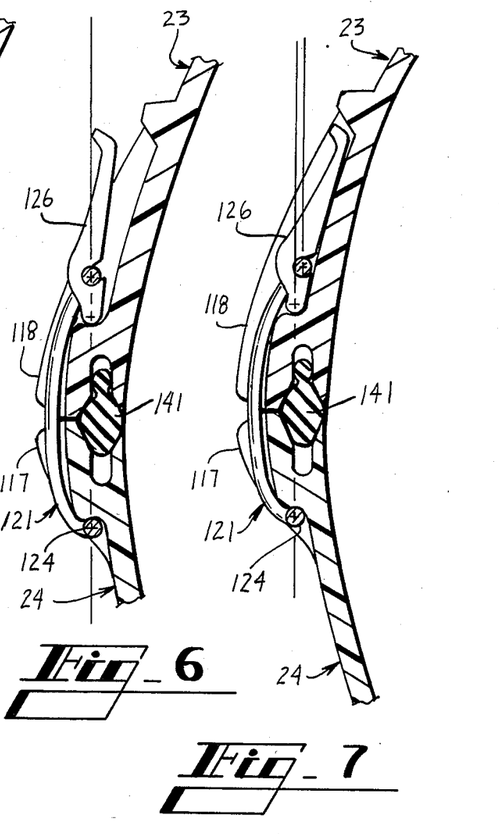
FIGS. 6-7 are a series of views which depict the actuation of the latching arrangement of FIG. 5 to secure together the covers.

As the latching fingers 126—126 are moved over center, each of the longitudinal gaskets 141—141 reforms and fills portions of the grooves 121 and 113 between the covers 23 and 24 (see FIG. 7). Further, the closing of the covers 23 and 24 causes compressive forces to be applied to the circumferential gaskets. As a result, air tight seals are formed by the circumferential and longitudinal gaskets.

Figure 16:
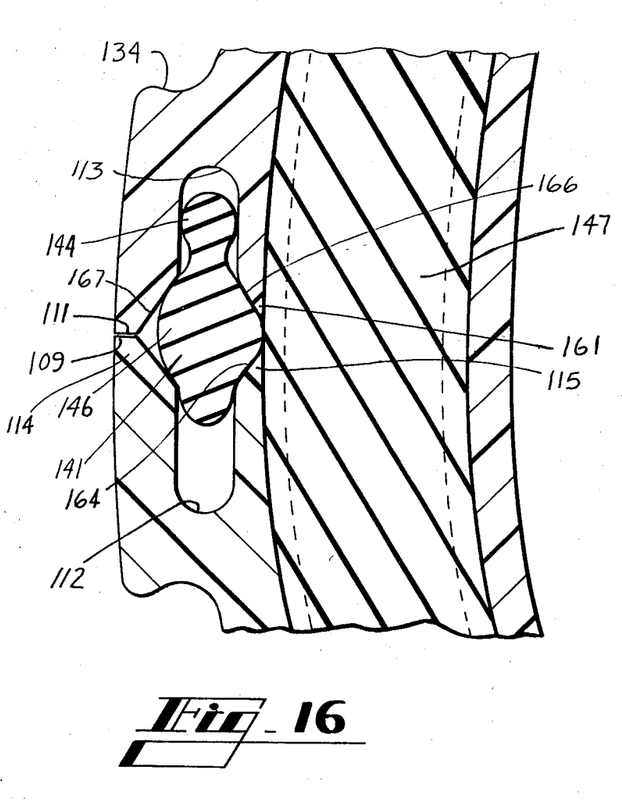
FIG. 16 is a detail view of a joint between gaskets of an end plate assembly and the covers after the application of forces to close the covers and to reconfigure the gaskets.

The configuration and the hardness of the gaskets are important to the adequate sealing of the joints therebetween, particularly at the triple point. As will be recalled, the circumferential gasket 147 is formed with a plurality of fins or ribs 148—148 whereas the longitudinal gaskets have no relatively thin portions. These forces cause both the circumferential and the longitudinal gaskets to become reconfigured with portions the longitudinal gaskets being moved slightly toward each circumferential gasket 147 (see FIG. 16). The hardness of the longitudinal and circumferential gaskets is about 45 on a Shore A hardness scale. As a result, when the forces are applied by the latching system, the body portion of the longitudinal gasket is capable of protruding inwardly through a window formed between opposing interior walls 115 and 161 of the covers (see FIG. 16). Because the body portion 146 of the longitindual gasket spans across the crests of the fins 148—148, the movement of the body portion is able to compress the fins somewhat to allow the periphery of the body portion 146 to form a compliant seal with the circumferential gasket. The use of the fins 148—148 reduces the magnitude of the forces required to form an effective seal and hence allows the use of the latching system of this invention as opposed to using prior art systems which includes bolts.

Figure 17:
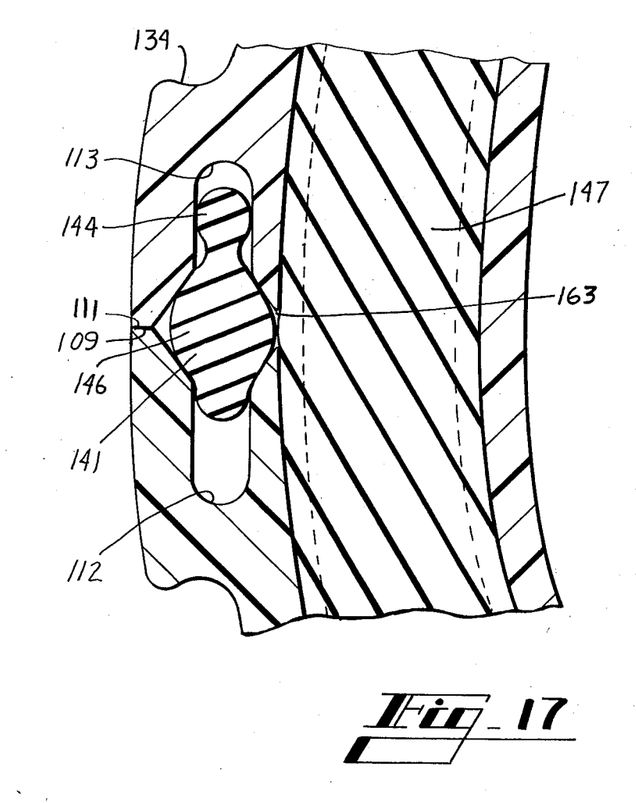
FIG. 17 is a detail view of an unacceptable joint between the gaskets at the confluence of the circumferential and longitudinal gaskets.

The arrangement of the gaskets must be such that the circumferential gasket 147 does not protrude excessively into any of the longitudinal gaskets 141—141 or that the longitudinal gaskets do not protrude excessively into engagement with either circumferential gasket. Should either protrusion be excessive, the gaskets will not provide an air tight seal. Also, the gasket 141 must protrude sufficiently to become disposed in engagement with the circumferential gaskets. If not, small openings 163—163 (see FIG. 17) appear between the gaskets and allow pressurized gas to escape.

It is also important that the body portion 146 be in compliant engagement with surfaces 164 and 166 (see FIG. 16) of the walls 115 and 161 and to touch portions of surfaces of the wall 114 and of a wall 167. Further, the protrusion of the body portion 146 into engagement with the ribs 148—148 of the circumferential gasket 147 must not cause the circumferential gasket to become disengaged from the inner surfaces 106—106 of the covers 23 and 24.

Another advantage of the closure 20 of this invention derives from the rotatability of its end plate assemblies 30—30. Should the closure be immediately adjacent to a wall for example, problems could arise in the actuation of the latching mechanism along one side of the closure. With the closure 20, a craftsperson assembles the covers 23 and 24 together with the end plate assemblies 30—30. The craftsperson actuates the latching mechanism of the joint spaced from the wall and then rotates the covers 23 and 24 about the end plate assemblies 30—30 to expose the other longitudinal joint and its latching mechanism. Then the craftsperson actuates that other latching mechanism to complete the securing of the covers 23 and 24.

Figure 18:
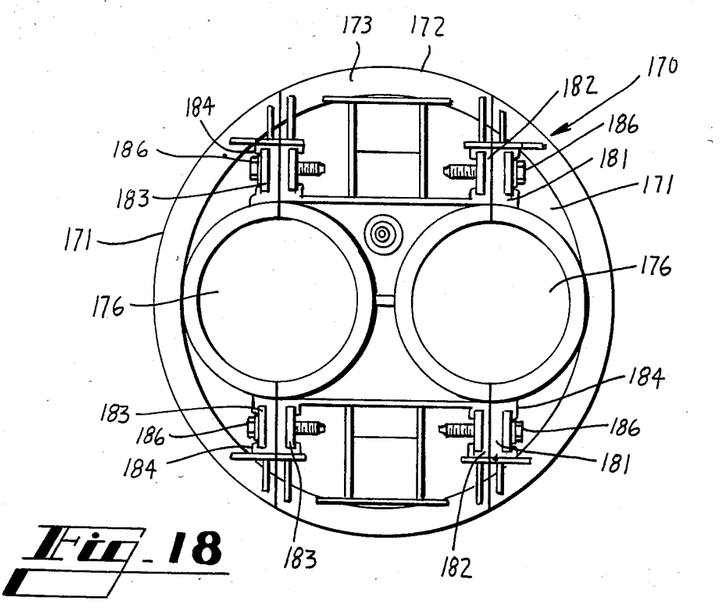
FIG. 18 is an elevational view of an end plate assembly which accommodates two cables.

In FIG. 18, there is shown an end plate assembly 170 which accommodates two cables. The end plate assembly 170 comprises two identical outer portions 171—171 and a center portion 172. The center portion is provided with nests 173—173 similar to the nests 66—66 in the end plate assembly 30 for receiving an alignment bar 74. Further, the center and outer portions 172 and 171—171 cooperate to form two openings 176—176 which are adapted to receive portions of cables which have been wrapped with a sealing tape disposed between retaining washers.

The end plate assembly 170 also includes facilities for securing together the outer portions 171—171 and the center portion 172. As can be seen in FIG. 18, shelves 181—181 are formed in each end section and 182—182 in the center section. When the plastic portions are mated together to form a conically shaped end plate, the shelves are aligned. Bearing plates 183—183 are received in ways provided by overhanging portions 184—184 and fasteners 186—186 turned through threaded holes in the interior plates. Cable clamps (not shown) are slidably disposed under down turned ends of the bearing plates and engage the cables as did the cables 77—77 shown in FIG. 3.

Figure 19:
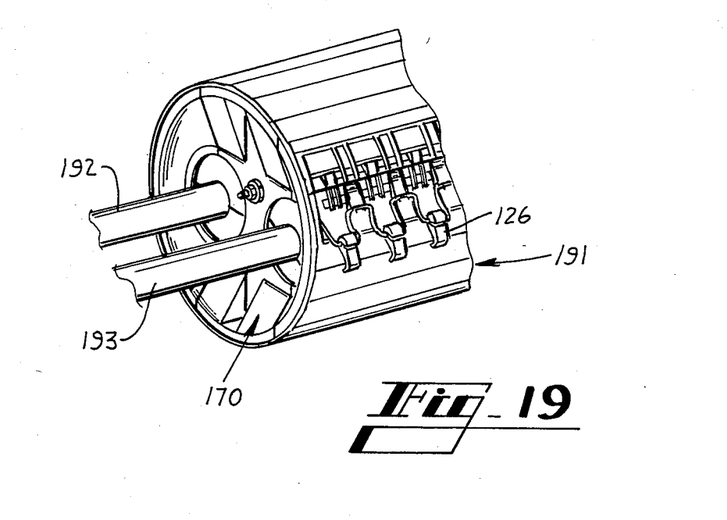
FIG. 19 is a perspective view of the end plate assembly of FIG. 18 after it has been assembled about two cables and after covers have been positioned about the end plate assembly.

In FIG. 19 there is depicted a cable closure 191 which includes the end plate assembly 170 to accommodate two cables 192 and 193. The covers and the cover fastener system are identical to those used in the single cable end plate closure 20.

It is to be understood that the above-described arrangements are simply illustrative of the invention. Other arrangements may be devised by those skilled in the art which will embody the principles of the invention and fall within the spirit and scope thereof.

What is claimed is:

1. A closure adapted to have at least one cable extending thereinto, said closure comprising:

first and second aligned end plates being spaced apart with at least one end plate having at least one opening therein to allow at least one cable to extend into the closure;

first and second covers which are assembled together to enclose peripheries of said end plates and which include adjacent longitudinal edge portions having facing grooves;

a circumferential resilient gasket which has longitudinally extending weakened portions and which is disposed about the periphery of each said end plate between the end plate and said covers;

a longitudinal resilient gasket which is disposed within the facing grooves at each joint between said covers and which spans across adjacent weakened portions of a circumferential gasket, each said longitudinal gasket being disposed in compliant engagement with said weakened portions of said circumferential gasket and with walls which form said grooves at each confluence between said covers and an end plate; and means for causing forces to be applied to said covers to hold said covers secured together and to cause each said longitudinal gasket to become disposed in and to be maintained in compliant engagement with said weakened portions of said circumferential gasket at each confluence of said covers and each end plate, said longituidinal and circumferential gaskets providing seals between said covers and between said covers and said end plates.

2. The closure of claim 1, wherein said forces are sufficient to cause portions of each said longitudinal gasket to be maintained in compliant engagement with walls of said facing grooves and said weakened portions adjacent to each end of each said longitudinal gasket to be maintained in compliant engagement with inner surfaces of said covers.

3. The closure of claim 2, wherein the engagement of said longitudinal gasket with said weakened portions is accomplished while the compliant engagement of said longitudinal gasket with walls of said grooves and of said circumferential gaskets with inner surfaces of said covers is maintained.

4. The closure of claim 2, wherein each said longitudinal gasket is formed with a head portion and an arcuately shaped body portion and wherein said facing grooves of said covers are such that either portion of said longitudinal gasket may be inserted into either of said facing grooves.

5. The closure of claim 2, which also includes means for connecting the end portions of the gasket which is disposed about the circumference of each end plate.

6. The closure of claim 2, wherein inner wall portions of said covers which define said grooves are capable of flexing under the influence of said forces to allow said gaskets to become seated in compliant engagement with each other.

7. The closure of claim 2, said closure being reenterable and said gaskets being reuseable and wherein said means for applying forces to said covers includes pivotally moveable means and causes said covers to be moved toward each other during assembly of said closure, said forces being effective to compress said longitudinal and circumferential gaskets to provide longitudinal and circumferential extending seals and to cause a portion of each said longitudinal gasket to protrude slightly into sealing engagement with a portion of the adjacent circumferential gasket at each said confluence where a longitudinal gasket spans across said weakened portions of a circumferential gasket.

8. The closure of claim 2, wherein said means for applying said forces includes pivotally moveable, self-adjusting means.

9. The closure of claim 8, wherein said means for applying said forces includes pivotally moveable spring-loaded means.

10. The closure of claim 9, wherein said means for applying forces includes a longitudinally extending continuous wire latch support frame which is mounted pivotally along spaced portions of the frame which are supported along a longitudinal edge portion of each cover and which has a plurality of spaced latching fingers mounted pivotally thereon, said wire frame between said spaced portions and portions thereof along which are mounted said latching fingers having an arcuate configuration, one end of each said latching finger of one cover adapted to engage an associated seat adjacent to a longitudinal edge portion of the other cover and the other end of each said latching finger being adapted to be turned to cause said one end to apply forces to its associated seat when said covers are in an open position to cause said covers to be moved toward each other and to be turned further toward said other cover to become locked in position.

11. The closure of claim 10, wherein said continuous wire support frame includes a plurality of interconnected U-shaped portions with the legs of each U-shaped portion being arcuately shaped.

12. The closure of claim 11, wherein alternating portions of said frame which interconnect the legs of said U-shaped portions have said latching fingers mounted thereon and wherein portions of said U-shaped portions between said alternating portions are connected to the longitudinal edge portion of one cover in a manner to allow pivotal movement of said frame, wherein when the cover portions are being moved from the closed to the open position the force applied to each said seat by the associated one end of each said latching finger is a maximum when the portion along which the wire frame is mounted is aligned with a portion of the wire frame on which the latching finger is mounted pivotally and the end of the latching finger which engages the associated seat, the arcuate shape of each U-shaped portion on which is mounted a latching finger tending to become flattened as said latching finger is moved through the point where maximum forces are applied and wherein the forces are reduced as the other end of each latching finger is moved toward the other cover to misalign its fulcrum from the one end and the portion which mounts the wire latch support frame pivotally.

13. The closure of claim 12, wherein predetermined ones of said latching fingers have slotted openings and one end thereof spaced from a fulcrum a distance to provide sufficient leverage with a tool disposed in said slotted opening of each to cause said other end to be seated in engagement with an associated seat to close said covers and facilitate the locking of the remainder of said latching fingers.

14. The closure of claim 12, wherein said wire support frame is effective to cause said latching fingers to maintain the gaskets in compliant engagement with each other and with the covers and end plates over a temperature range of about −40° F. to +140° F.

* * * * *